United States Patent
Ogawa (10) Patent No.: US 9,857,183 B2
(45) Date of Patent: Jan. 2, 2018

(54) TRAVEL SUPPORT DEVICE, TRAVEL SUPPORT METHOD, AND DRIVE SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 14/604,257

(22) Filed: Jan. 23, 2015

(65) Prior Publication Data

US 2015/0241227 A1 Aug. 27, 2015

(30) Foreign Application Priority Data

Feb. 24, 2014 (JP) ................................. 2014-033465

(51) Int. Cl.
*G01C 21/34* (2006.01)

(52) U.S. Cl.
CPC ......... *G01C 21/34* (2013.01); *G01C 21/3469* (2013.01)

(58) Field of Classification Search
CPC .................. G01C 21/34; G01C 21/3469
See application file for complete search history.

(56) References Cited

U.S. PATENT DOCUMENTS

| 2002/0026278 A1* | 2/2002 | Feldman | G08G 1/0104 701/117 |
| 2011/0071712 A1* | 3/2011 | Mizuno | B60K 6/46 701/22 |

FOREIGN PATENT DOCUMENTS

| JP | 2009-012605 A | 1/2009 |
| WO | 2015/019142 A1 | 2/2015 |

* cited by examiner

*Primary Examiner* — Jerrah Edwards
*Assistant Examiner* — Kelly D Williams
(74) *Attorney, Agent, or Firm* — Oliff PLC (57) ABSTRACT

A travel support device includes a planner, an information generator, and a traffic information obtaining unit. To each of a plurality of sections into which a travel route from the current location to the destination is divided, the planner is adapted to assign, based on a road load associated with each section, a travel mode among a first mode, in which a remaining energy charge of the battery of the vehicle is not maintained, and a second mode, in which the remaining energy charge of the battery is maintained. When traffic congestion information is acquired by the traffic information obtaining unit, the information generator is adapted to set a traffic congestion road load, which is a fixed road load, for a section in which the traffic congestion is occurring.

4 Claims, 5 Drawing Sheets

TRAVEL SUPPORT DEVICE, TRAVEL SUPPORT METHOD, AND DRIVE SUPPORT SYSTEM

BACKGROUND OF THE INVENTION

The present invention relates to a travel support device, a travel support method, and a drive support system that support travel from a current location to a destination of a vehicle provided with an internal combustion engine and a motor as drive sources.

As a vehicle capable of selectively switching among a plurality of travel modes, a hybrid vehicle, which uses both an internal combustion engine and a motor as its drive sources, is known. As the travel modes, the hybrid vehicle has an electric vehicle (EV) travel mode that places priority on EV travel, in which the internal combustion engine is stopped and only the motor is used to travel, a hybrid vehicle (HV) travel mode that places priority on HV travel, in which the internal combustion engine and the motor are used to travel. The EV travel mode is a travel mode in which the remaining energy charge of the battery is not maintained and the HV travel mode is a travel mode in which the remaining energy charge of the battery is maintained. Also, a travel support device that is installed in the hybrid vehicle and includes a navigation system provides support by calculating a travel route from the current location to a destination based on information such as map information and road traffic information and selecting the travel mode to be applied to each of a plurality of sections in the travel route. For example, Japanese Laid-Open Patent Publication No. 2009-12605 discloses an example of a vehicle controller having such a travel support function.

In the vehicle controller described in Japanese Laid-Open Patent Publication No. 2009-12605, the travel modes of the respective sections in the travel route are set in consideration of the battery energy balance for the entire travel route so that the remaining energy charge of the battery, which is a rechargeable battery, becomes zero at the point of arrival at the destination. However, in a section in which traffic congestion is occurring, the road load tends to become lower than that during normal traveling so that the battery energy cannot be consumed completely and the remaining battery charge may thus not become zero at the point of arrival at the destination.

Such a problem is generally common to devices and methods that assign travel modes to respective sections in a travel route for a vehicle having a plurality of travel modes that differ in battery energy balance.

SUMMARY OF THE INVENTION

An object of the present invention is to provide a travel support device, a travel support method, and a drive support system capable of promoting the optimization of battery consumption in a travel route even when a traffic congestion section is included in the travel route.

To achieve the foregoing objective and in accordance with a first aspect of the present invention, a travel support device for supporting a vehicle having an internal combustion engine and a motor as drive sources to move from a current location to a destination is provided. The travel support device includes a planner adapted to plan vehicle travel modes to be respectively assigned to each of a plurality of sections into which a travel route from the current location to the destination is divided, an information generator adapted to generate information related to a road load associated with each of the plurality of sections, and a traffic information obtaining unit adapted to acquire traffic congestion information of the respective sections in the travel route. To each of the plurality of sections, the planner is adapted to assign, based on a road load associated with the respective sections, a travel mode among a first mode, in which a remaining energy charge of a battery of the vehicle is not maintained, and a second mode, in which the remaining energy charge of the battery is maintained. When traffic congestion information is acquired by the traffic information obtaining unit, the information generator is adapted to set, for a section in which the traffic congestion is occurring, a traffic congestion road load, which is a fixed road load that is lower than a road load during normal traveling.

To achieve the foregoing objective and in accordance with a second aspect of the present invention, a travel support device for supporting a vehicle having an internal combustion engine and a motor as drive sources to move from a current location to a destination is provided, the travel support device includes a planner adapted to plan vehicle travel modes to be respectively assigned to each of a plurality of sections into which a travel route from the current location to the destination is divided, an information generator adapted to generate information related to a road load associated with each of the plurality of sections, and a traffic information obtaining unit adapted to acquire traffic congestion information of the respective sections in the travel route. To each of the plurality of sections, the planner is adapted to assign, based on a road load associated with the respective sections, a travel mode among a first mode, in which a remaining energy charge of a battery of the vehicle is not maintained, and a second mode, in which the remaining energy charge of the battery is maintained. When traffic congestion information is acquired by the traffic information obtaining unit, the information generator is adapted to compare a road load during normal traveling of a section in which the traffic congestion is occurring with a traffic congestion road load, which is a fixed road load that is lower than a road load during normal traveling, and to set the lower of the road loads as the road load of the section in which the traffic congestion is occurring.

To achieve the foregoing objective and in accordance with a third aspect of the present invention, a travel support method for supporting a vehicle having an internal combustion engine and a motor as drive sources to move from a current location to a destination is provided. The method includes: dividing a travel route from the current location to the destination into a plurality of sections; planning vehicle travel modes to be respectively assigned to each of the plurality of sections, wherein the travel modes are planned by assigning, to each of the plurality of sections and based on a road load associated with respective sections, a travel mode among a first mode, in which a remaining energy charge of a battery of the vehicle is not maintained, and a second mode, in which the remaining energy charge of the battery is maintained; and setting, when traffic congestion information in the travel route is acquired, a traffic congestion road load, which is a fixed road load that is lower than a road load during normal traveling, as the road load to be referenced in the planning for a section in which the traffic congestion is occurring.

To achieve the foregoing objective and in accordance with a fourth aspect of the present invention, a travel support method for supporting a vehicle having an internal combustion engine and a motor as drive sources to move from a current location to a destination is provided. The method includes: dividing a travel route from the current location to the destination into a plurality of sections; planning vehicle travel modes to be respectively assigned to each of the plurality of sections, wherein the travel modes are planned by assigning, to each of the plurality of sections and based on a road load associated with respective sections, a travel mode among a first mode, in which a remaining energy charge of a battery of the vehicle is not maintained, and a second mode, in which the remaining energy charge of the battery is maintained; and comparing, when traffic congestion information in the travel route is acquired, a road load during normal traveling of a section in which the traffic congestion is occurring with a traffic congestion road load, which is a fixed road load that is lower than a road load during normal traveling, and setting the lower of the road loads as the road load of the section in which the traffic congestion is occurring.

To achieve the foregoing objective and in accordance with a fifth aspect of the present invention, a drive support system for supporting driving of a vehicle having an internal combustion engine and a motor as drive sources is provided. The system includes the travel support device according to the first aspect or second aspect. The travel support device is adapted to assign one travel mode selected from a plurality of different travel modes of the vehicle to each of a plurality of sections into which a travel route from a current location to a destination of the vehicle is divided and plan the vehicle travel modes based on the assignment.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A travel support device, a travel support method, and a drive support system according to one embodiment will now be described with reference to FIGS. 1 to 3. The travel support device, the travel support method, and the drive support system according to the present embodiment are applied to a hybrid vehicle that uses as drive sources an electric motor 114 using a battery constituted of a rechargeable battery as a power source and an internal combustion engine 115 using gasoline or other fuel as a power source.

Figure 1:
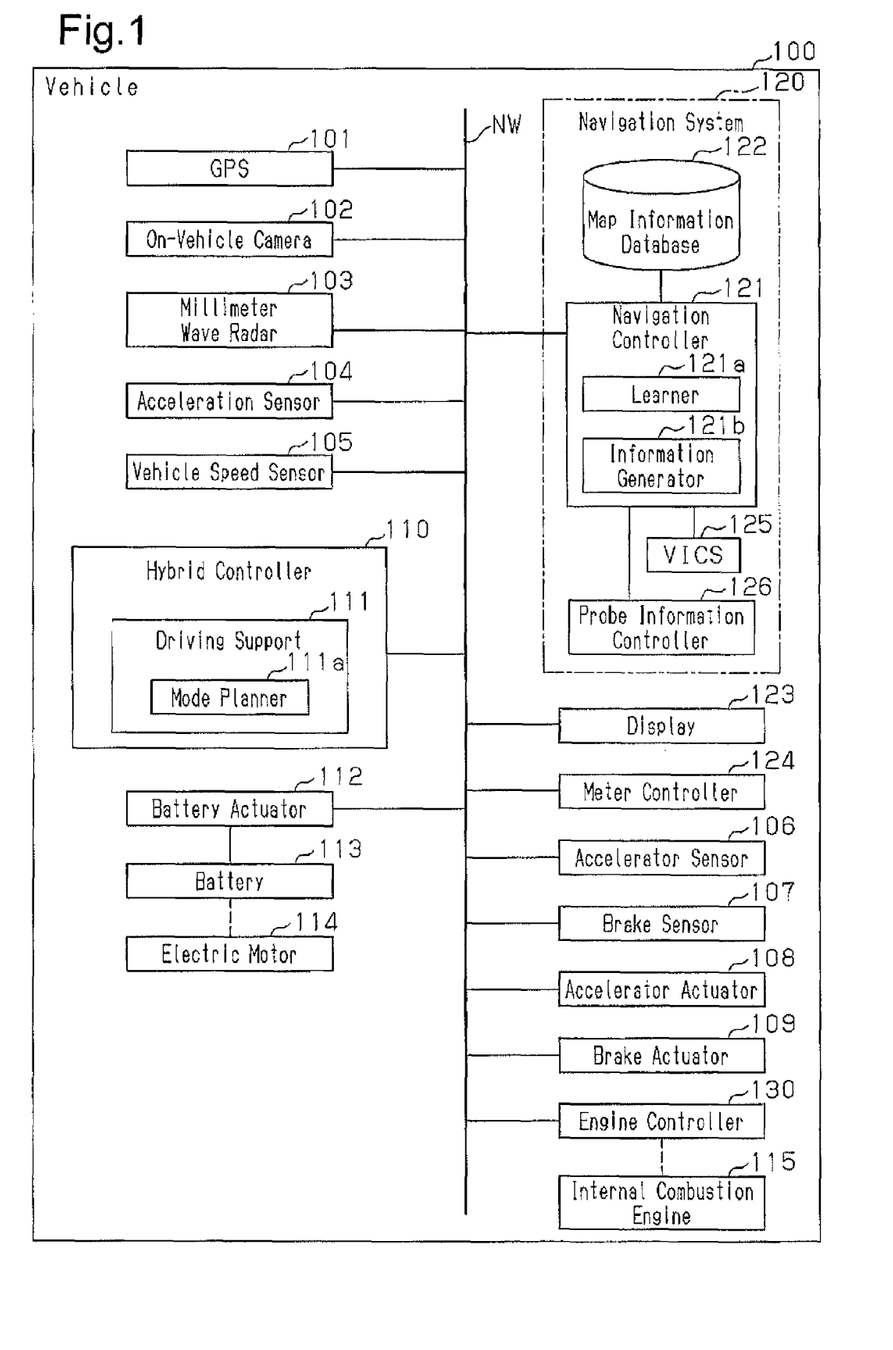
FIG. 1 is a block diagram of a schematic configuration of a travel support device according to one embodiment.

As shown in FIG. 1, a vehicle 100 has as devices for detecting a traveling state of the vehicle 100, for example, a global positioning system (GPS) 101, an on-vehicle camera 102, a millimeter wave radar 103, an acceleration sensor 104, and a vehicle speed sensor 105. The GPS 101, the on-vehicle camera 102, the millimeter wave radar 103, the acceleration sensor 104, and the vehicle speed sensor 105 are connected via an on-vehicle network NW to a hybrid controller 110, a navigation controller 121 of a navigation system 120, and an engine controller 130. As the on-vehicle network NW, for example, a control area network (CAN) is used. Also, each of the hybrid controller 110, navigation controller 121, and engine controller 130 is an electronic control unit (ECU), in other words, a processor and includes a small computer that includes an arithmetic device and a storage device. Each of the hybrid controller 110, navigation controller 121, and engine controller 130 is capable of performing various control processes by the arithmetic device executing computations in accordance with programs stored in the storage device.

The GPS 101 receives signals from GPS satellites to detect the location of the vehicle 100, for example, in the form of latitude and longitude based on the received signals. Also, the GPS 101 outputs location information of the detected vehicle 100. The on-vehicle camera 102 performs imaging of the surrounding environment of the vehicle 100 and outputs image data obtained by the imaging. The millimeter wave radar 103 detects the presence of an object in the vicinity of the vehicle 100 by using radio waves in the millimeter wave band and outputs a signal corresponding to the detection result.

The acceleration sensor 104 detects the acceleration of the vehicle 100 and outputs a signal corresponding to the detected acceleration. The vehicle speed sensor 105 detects the rotational speed of a wheel of the vehicle 100 and outputs a signal corresponding to the detected rotational speed.

An accelerator sensor 106 detects the amount by which an accelerator pedal is operated by the driver and outputs a signal corresponding to the accelerator pedal operation amount. A brake sensor 107 detects the amount by which a brake pedal is operated by the driver and outputs a signal corresponding to the detected brake pedal operation amount.

The vehicle 100 is also provided with an accelerator actuator 108, which controls the operation of the internal combustion engine 115, and a brake actuator 109, which controls the brake. The accelerator actuator 108 and the brake actuator 109 are electrically connected to the on-vehicle network NW. The accelerator actuator 108 controls the internal combustion engine 115 based on a drive control amount for the internal combustion engine 115, which is calculated by the engine controller 130 according to the detection value of the accelerator sensor 106. Also, the brake actuator 109 controls the brake based on a control amount for the brake, which is calculated by the engine controller 130 according to the detection value of the brake sensor 107.

Further, the vehicle 100 includes the electric motor 114, which is a drive source, a battery 113, which is a power source of the electric motor 114, and a battery actuator 112, which controls charging/discharging of the battery 113. The battery actuator 112 is electrically connected to the on-vehicle network NW. The battery actuator 112 manages, for example, the charging/discharging of the battery 113. Also, the battery actuator 112 controls the discharge of the battery 113 to drive the electric motor 114 and charges the battery 113 by regeneration by the electric motor 114.

The vehicle 100 includes the hybrid controller 110, which controls operation of the internal combustion engine 115 and the electric motor 114. The hybrid controller 110 is electrically connected via the on-vehicle network NW to the battery actuator 112, the accelerator actuator 108, and the brake actuator 109.

Based on the respective detection results of the acceleration sensor 104, the vehicle speed sensor 105, and the accelerator sensor 106, the hybrid controller 110 determines an output ratio of the internal combustion engine 115 and the electric motor 114, that is, a driving force distribution of the internal combustion engine 115 and the electric motor 114. Particularly, the hybrid controller 110 changes the driving force distribution of the internal combustion engine 115 and the electric motor 114 to adjust the remaining energy charge of the battery 113. The hybrid controller 110 executes EV travel, in which the internal combustion engine 115 is stopped and the electric motor 114 is used as the drive source, and HV travel, in which the internal combustion engine 115 and the electric motor 114 are used as the drive sources.

The hybrid controller 110 selectively switches the travel mode of the vehicle 100 between a charge depleting (CD) travel mode, in which the charge amount, in other words, the remaining charge of the battery 113 is consumed, and a charge sustaining (CS) travel mode, in which the remaining charge of the battery 113 is maintained.

The CD travel mode is a travel mode in which the electric power charged in the battery 113 is consumed proactively without maintaining the remaining charge of the battery 113 and is a travel mode in which priority is placed on EV travel. Hereinafter, the CD travel mode will be described as the EV travel mode. Even when the travel mode of the vehicle 100 is switched to the EV travel mode, the internal combustion engine 115 will also be driven if the accelerator pedal is stepped on strongly to demand a large travel power.

The CS travel mode is a travel mode in which the remaining charge of the battery 113 is maintained within a predetermined range that includes a reference value and is a travel mode in which priority is placed on HV travel, in which the internal combustion engine 115 is driven as necessary to put the electric motor 114 in regenerative operation. Hereinafter, the CS travel mode will be described as the HV travel mode. Even when the travel mode of the vehicle 100 is switched to the HV travel mode, the internal combustion engine 115 is stopped if the remaining charge of the battery 113 exceeds the reference value. As the reference value, the value of the remaining charge of the battery 113 when the travel mode of the vehicle 100 is switched from the EV travel mode to the HV travel mode or the value of the remaining charge determined to be necessary for sustaining the performance of the battery 113 is set as appropriate.

Based on the distribution of driving force among the internal combustion engine 115 and the electric motor 114 under the EV travel mode or the HV travel mode that has been selected, the hybrid controller 110 generates a control instruction for the battery actuator 112 in relation to the discharging of the battery 113 and the like, and generates information related to a drive control amount of the internal combustion engine 115 that is to be calculated by the engine controller 130. Also, based on the respective detection results of the acceleration sensor 104, the vehicle speed sensor 105, and the brake sensor 107, the hybrid controller 110 determines the distribution of braking force among the brake and the electric motor 114. Based on the distribution of braking force among the brake and the electric motor 114, the hybrid controller 110 generates a control instruction for the battery actuator 112 in relation to the charging of the battery 113 and the like, and generates information related to a control amount of the brake that is to be calculated by the engine controller 130. The hybrid controller 110 outputs the various generated control instructions to the battery actuator 112 to control the charging/discharging of the battery 113. The electric motor 114 is thereby driven with the battery 113 as the power source or the battery 113 is charged by regeneration by the electric motor 114. Also, the hybrid controller 110 is capable of monitoring executing states of hybrid control and the charged rate of the battery 113.

The hybrid controller 110 selectively switches the travel mode of the vehicle 100 between the EV travel mode and the HV travel mode according to the result of selection by the driver. The hybrid controller 110 also selectively switches the travel mode of the vehicle 100 between the EV travel mode and the HV travel mode based on information related to travel power, or road loads required for travel in respective sections in a travel route of the vehicle 100 that is input from the navigation controller 121 and the like. The road load is the load amount per unit distance in each section and is an average load amount required for travel in the section. In contrast, an accumulated value of the road load required for completion of travel in each section is defined as consumption energy.

The vehicle 100 is provided with a map information database 122 in which map data are registered. The map data are data related to geography such as roads. Information related to locations such as latitude and longitude is registered in the map data together with display type data, in other words, geographical information data that enables display of geography. The display type data include display information of geographical features such as rivers, lakes, and seas. The map data may also have registered therein such information as intersection names, road names, district names, directional guides, and facility information.

Also, the map information database 122 includes information related to nodes, each of which indicates a location among a plurality of locations on roads (hereinafter referred to as "node data"), and information related to links, each of which connects two nodes (hereinafter referred to as "link data"). A node is set on the road at a location of a specific traffic element such as an intersection, a traffic signal, and a curve or at a location where the number of lanes is changed. Node data include information related to a road location at which a node is present and road information of the location. A link expresses a road section present between two nodes, that is, a road section partitioned by the two nodes. The link data include information of the two nodes included in the link and road information of the section corresponding to the link. The road information in the link data includes information of starting point location, ending point location, distance, and route, undulations of the section. The link data also include various types of data such as cost data including the road load in the link of the section, road data including the road type, mark data indicating a specific location, intersection data indicating information of an intersection, and facility data indicating information of a facility.

To be specific, the node data may include, for example, a node ID, which is an identification number of the node, coordinates of the node, link IDs of all links connected to the node, a node type indicating the type such as intersection and junction. The node data may also include data indicating the characteristics of the node, such as an image ID that is an identification number of an image representing the node.

Also, the link data include, for example, a link ID, which is an identification number of the link, a link length, and the node IDs of the respective nodes connecting to the starting point and ending point of the link. The link data also include data indicating a road type such as expressway, toll road, ordinary road, urban/suburban road, mountain road, tunnel, bridge, and interchange as well as necessary information among data indicating the road width, the number of lanes, the link traveling time, the legal speed limit, the road gradient, and the like. Further, the link data may include data indicating averages, maximum values, minimum values of moving time, moving speed, fuel consumption, and electric power consumption as road load information that is a required output of the vehicle 100 in each link. The electric power consumption is the amount of electric power consumed by the electric motor 114 when the vehicle 100 travels in the EV travel mode and the unit thereof may be set to [kW]. The road load of a link is acquired or calculated based on such road load information. As mentioned above, the road load is the load amount per unit distance in the link and is the average load amount required for travel in the link. The consumption energy, which is the accumulated value of the road load required for completion of travel in the link, can be calculated from the road load and the link length.

The vehicle 100 includes a navigation system 120, which provides route guidance. The navigation controller 121 of the navigation system 120 acquires the latitude and longitude from the GPS 101 as information indicating the current location point of the vehicle 100. Also, when a destination point is set by the driver, the navigation controller 121 determines the latitude and longitude of the destination point. The navigation controller 121 then searches for a travel route from the current location point of the vehicle 100 to the destination point by referencing the map information database 122 and using, for example, the Dijkstra's algorithm.

The navigation controller 121 includes a learner 121a that learns the moving time, moving speed, fuel consumption, and electric power consumption in the travel route travelled by the vehicle 100. The learner 121a functions as a travel support device by a process of executing a program in the navigation controller 121. The learner 121a acquires the moving time, moving speed, fuel consumption, and electric power consumption of each section in the travel route from various sensors and stores the acquired information in association with a corresponding section of the map information database 122. The learner 121a accumulates the information in the corresponding section of the map information database 122 each time the same section is travelled to improve the precision of information of each section.

The navigation controller 121 also includes an information generator 121b, which generates information such as the road load referenced by the hybrid controller 110 during travel mode planning. The information generator 121b functions as a travel support device by a process of executing a program in the navigation controller 121. In particular, the information generator 121b includes a function of calculating the road loads of the respective sections in the travel route based on gradient information and traffic congestion information of the respective sections. The information generator 121b calculates the road load during normal traveling based on vehicle information such as the moving time, moving speed, fuel consumption, and electric power consumption of the vehicle 100 and on traveling environment information. The learner 121a then stores the information in association with the respective sections of the map information database 122.

The navigation controller 121 is connected to a vehicle information and communication system, that is, a VICS (registered trademark) 125 that acquires information such as traffic congestion information, required time, accident information, disabled vehicle information, construction work information, speed limit information, and lane information. The navigation controller 121 is also connected to a probe information controller 126, and the probe information controller 126 acquires probe traffic information, which is road traffic information generated using information, such as location and vehicle speed of actual travel obtained from a data center and vehicles that share information. The information generator 121b can thus acquire traffic congestion information from either or both of the VICS 125 and the probe information controller 126 to determine a section, among the respective sections of the travel route, in which traffic congestion is occurring. The VICS 125 and the probe information controller 126 function as traffic information obtaining units.

The navigation controller 121 then outputs information indicating the retrieved travel route and the calculated road load, moving time, moving speed, fuel consumption, and electric power consumption, to the hybrid controller 110 via the on-vehicle network NW and also outputs the information via the on-vehicle network NW to a display 123 provided in the passenger compartment and constituted of a liquid crystal display.

Also, the vehicle 100 is provided with a meter controller 124, which controls the display states of meters displayed on an instrument panel provided on a dashboard. The meter controller 124 acquires data indicating, for example, the charged/discharged state, of the battery 113 from the hybrid controller 110, and visually displays, for example, an energy flow in the vehicle 100 based on the acquired data. The energy flow is a flow of energy in the vehicle 100 that is generated by the charging/discharging of the battery 113 and the operation of or regeneration by the electric motor 114. The energy flow may include a flow of energy in the vehicle 100 generated by the operation of the internal combustion engine 115.

When the travel route is input, the hybrid controller 110 assigns travel modes of the vehicle 100 to the respective sections in the travel route. The hybrid controller 110 includes a driving support 111, which supports such assignment of the travel modes. The driving support 111 acquires information of the travel route to the destination point set by the driver from the navigation controller 121. Also, the driving support 111 includes a mode planner 111a, which plans the travel modes to be assigned to the respective sections in the acquired travel route. The mode planner 111a functions as a travel support device by a process of executing a program in the hybrid controller 110. The mode planner 111a has the function of planning the travel modes to be assigned to the respective sections in consideration of the energy balance of the battery 113 for the entire travel route and according to the road loads during normal traveling of the respective sections in the travel route.

Generally, good energy efficiency tends to be exhibited when traveling by the electric motor 114 is applied to a section of comparatively low road load. Also, good energy efficiency tends to be exhibited when traveling by the internal combustion engine 115 is applied to a section of high road load. The hybrid controller 110 thus assigns the EV travel mode to a section of comparatively low road load and assigns the HV travel mode to a section of comparatively high road load.

For a plurality of target sections, the mode planner 111a compares the road loads of the respective sections and successively assigns the EV travel mode starting from a section of low road load. The mode planner 111a also integrates the consumption energy of the sections to which the EV travel mode was assigned and subtracts the integrated value of consumption energy from the remaining energy charge of the battery 113. The mode planner 111*a* then continues to assign the EV travel mode to each section such that the integrated value of the consumption energy does not exceed the remaining energy charge of the battery 113. The mode planner 111*a* thereby assigns the EV travel mode to the sections of relatively low road load among all sections in the travel route. Also, the mode planner 111*a* assigns the HV travel mode to the sections to which the EV travel mode was not assigned.

In a section in which traffic congestion is occurring, the actual road load tends to become lower than that during normal traveling so that the energy of the battery 113 cannot be consumed completely and the remaining charge of the battery 113 may thus not become zero at the point of arrival at the destination. For example, such a tendency is particularly exhibited when traffic congestion is occurring on a downgrade. Therefore, when the VICS 125 or the probe information controller 126 acquires information of a traffic congestion section, the information generator 121*b* compares the road load during normal traveling in the traffic congestion section and a traffic congestion road load, which is a fixed road load, and generates road load information of the traffic congestion section such that the lower of the road loads is set as the road load of the traffic congestion section. As mentioned above, the "road load during normal traveling" is a road load that is calculated based on the map data registered in the map information database 122 and is the road load in which traffic congestion is not taken into consideration. The "traffic congestion road load" is determined in advance as a fixed value that is lower than the road load when the vehicle 100 is undergoing normal traveling on a horizontal road, more specifically, a horizontal and rectilinear road (that is, traveling without congestion). By the road load information of the traffic congestion section being generated by the information generator 121*b*, the predicted energy consumption of the battery 113 is made close to the actual energy consumption so that optimization of the energy consumption of the battery 113 in the travel route is promoted even when a traffic congestion section is included.

The mode planner 111*a* outputs the travel modes assigned to the respective sections of the travel route as described above to the display 123 and makes the display 123 display the travel mode assigned to the section in which travel is being performed currently.

Whenever appropriate, the hybrid controller 110 acquires the location information of the travelling vehicle 100 to determine the section in which the vehicle 100 is currently travelling, in other words, the current section, and makes the vehicle 100 travel in the travel mode assigned to the determined current section. That is, each time the section in which the vehicle 100 is travelling transitions to the subsequent section, the hybrid controller 110 switches the travel mode of the vehicle 100 to the travel mode assigned to the subsequent section. The vehicle 100 is thereby made to travel in the travel mode assigned to the current section.

Figure 2:
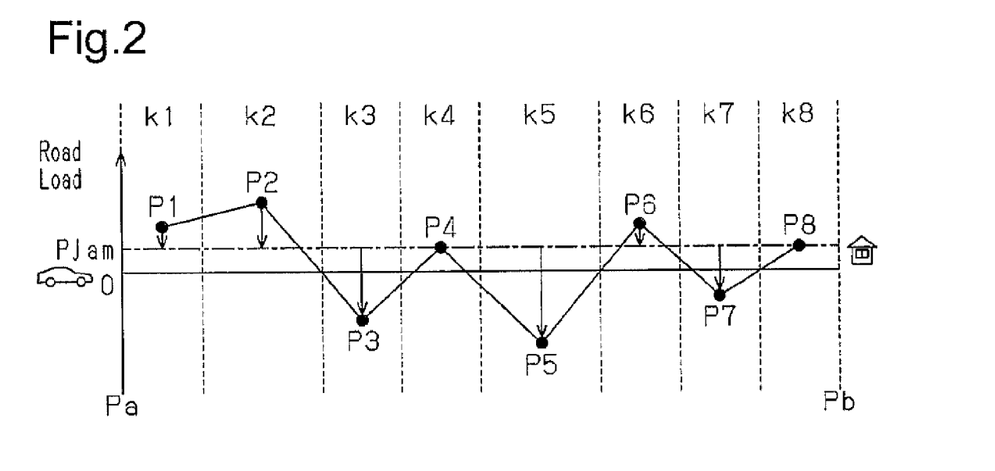
FIG. 2 is a diagram of an example of road loads set for respective sections in a travel route by the travel support device shown in FIG. 1.

For example, as shown in FIG. 2, when the vehicle 100 travels from a current location point Pa to a destination point Pb, a travel route that includes a first section S1 to an eighth section S8 is retrieved by the navigation system 120. Also, information concerning the road load, consumption energy and the like in each section Sn of the first section S1 to the eighth section S8 is obtained from the map information database 122. FIG. 2 is a graph showing an example of road loads set in the respective sections in a travel route.

If a traffic congestion section is present as any of the sections S1 to S8 in the travel route, the information generator 121*b* compares a traffic congestion road load Pjam (for example, 2 kW) with a road load Pn during normal traveling in the traffic congestion section and generates road load information of the traffic congestion section such that the lower of the road loads is set as the road load of the traffic congestion section. For example, if traffic congestion is occurring in the first section S1, the traffic congestion road load Pjam is set as the road load of the first section S1 because the traffic congestion road load Pjam is lower than the normal traveling road load P1. Similarly, if traffic congestion is occurring in the second section S2, the traffic congestion road load Pjam is set as the road load of the second section S2 because the traffic congestion road load Pjam is lower than the normal traveling road load P2. If traffic congestion is occurring in the third section S3, the normal traveling road load P3 is set as the road load of the third section S3 because the normal traveling road load P3 is lower than the traffic congestion road load Pjam. If traffic congestion is occurring in the fourth section S4, the normal traveling road load P4 is set as the road load of the fourth section S4 because the normal traveling road load P4 and the traffic congestion road load Pjam are the same. If traffic congestion is occurring in the fifth section 55 and the seventh section S7, the normal traveling road loads P5 and P7 are set as the road loads of the fifth section S5 and the seventh section S7 because each of the normal traveling road loads P5 and P7 is lower than the traffic congestion road load Pjam. If traffic congestion is occurring in the sixth section SE, the traffic congestion road load Pjam is set as the road load of the sixth section SE because the traffic congestion road load Pjam is lower than the normal traveling road load P6. If traffic congestion is occurring in the eighth section S8, the normal traveling road load P8 is set as the road load of the eighth section S8 because the normal traveling road load P8 and the traffic congestion road load Pjam are the same.

By thus generating the road load information of the respective traffic congestion sections, the predicted energy consumption of the battery 113 is made close to the actual energy consumption. In each traffic congestion section, the learner 121*a* temporarily suspends the learning described above concerning the road load generated by the information generator 121*b*. Also, in the example of FIG. 2, the normal traveling road loads in the sections S1 to S8 are lower than the traffic congestion road load Pjam. In the example of FIG. 2, the third section S3, the fifth section S5, and the seventh section S7 include downgrades.

A procedure of a road load information generating process performed by the information generator 121*b* of the navigation controller 121 will now be described with reference to FIG. 3. Each time the destination point Pb is changed or the travel route is changed or the traffic congestion information is renewed, the information generator 121*b* generates road load information for the respective sections in the changed or renewed travel route.

Figure 3:
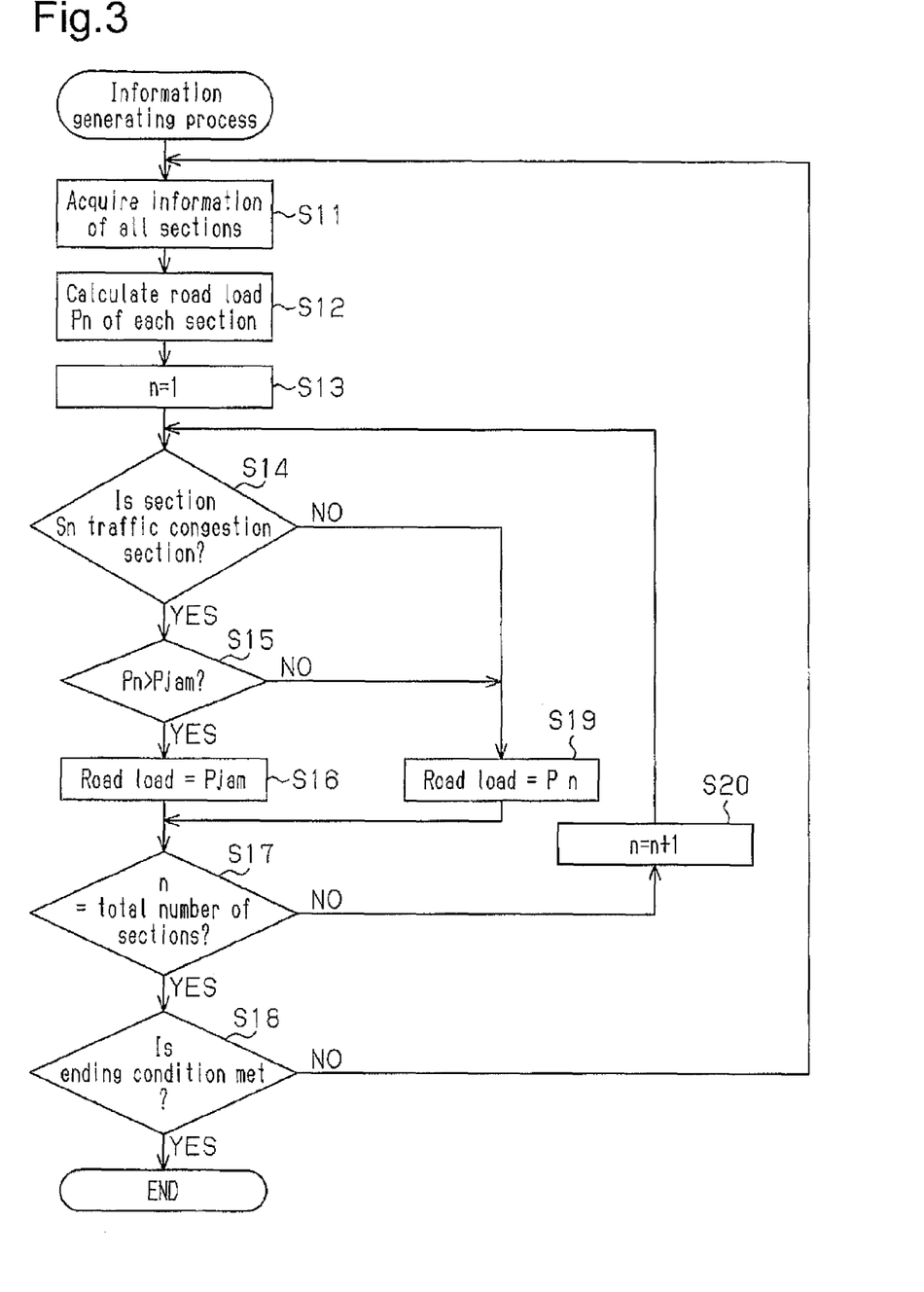
FIG. 3 is a flowchart of a procedure of an information generating process performed by the travel support device shown in FIG. 1.

As shown in FIG. 3, when the destination point is set, the navigation controller 121 acquires route information for all sections in the travel route (step S11). That is, the information generator 121*b* acquires the gradient, moving time, moving speed, fuel consumption, and electric power consumption of each section in the travel route from the map information database 122 and acquires information of traffic congestion sections from the VICS 125 and the probe information controller 126. Then based on the information acquired from the map information database 122, the information generator 121*b* calculates the normal traveling road load Pn of each section (step S12).

The navigation controller 121 generates road load information for each section Sn. First the navigation controller 121 sets the value n, which expresses the order of a section, to 1 (n=1) (step S13). Hereinafter, the nth section will be expressed as the section Sn. The navigation controller 121 determines whether the section Sn is a traffic congestion section (step S14). That is, the information generator 121b determines whether the section Sn is a traffic congestion section based on traffic congestion information acquired from the VICS 125 and the probe information controller 126. If the navigation controller 121 determines that the section Sn is not a traffic congestion section (step S14: NO), the navigation controller 121 proceeds to the normal traveling road load Pn is set as the road load of the section Sn (step S19) and step S17.

In contrast, if the navigation controller 121 determines that the section Sn is a traffic congestion section (step S14: YES), it determines whether the normal traveling road load Pn is higher than the traffic congestion road load Pjam (step S15). If the navigation controller 121 determines that the normal traveling road load Pn is lower than the traffic congestion road load Pjam (step S15: NO), the navigation controller 121 proceeds to step S19 and sets the normal traveling road load Pn as the road load of the section Sn.

If the navigation controller 121 determines that the normal traveling road load Pn is higher than the traffic congestion road load Pjam, in other words, that the traffic congestion road load Pjam is lower than the normal traveling road load Pn (step S15: YES), the navigation controller 121 sets the traffic congestion road load Pjam as the road load of the section Sn (step S16) and then proceeds to step S17.

The navigation controller 121 determines whether the value n is the same as the total number of the sections (step S17). That is, the information generator 121b checks whether the determination of a section being or not being a traffic congestion section has been performed on all sections. If the navigation controller 121 determines that the value n is not the same as the total number of the sections (step S17: NO), it adds 1 to the current value n to renew the value n and thereby change the section to be determined whether it is a traffic congestion section to the subsequent section (n=n+1) (step S20), returns to step S14, and repeats the processes of steps S14 to S16 and S19.

If the navigation controller 121 determines that the value n is the same as the total number of the sections (step S17: YES), it determines whether an information generating process ending condition is met (step S18). That is, the information generator 121b determines whether the remaining charge of the battery 113 has become slight. If the navigation controller 121 determines that there is a remaining charge of the battery 113 and the ending condition is not met (step S18: NO), it returns to step S11 and repeats the processes of steps S11 to S17, S19, and S20.

If the navigation controller 121 determines that the remaining charge of the battery 113 is slight and the ending condition is met (step S18: YES), the navigation controller 121 ends the information generating process because travel in the EV mode is no longer possible and there is no need to plan the assignment of the travel modes.

A procedure of a travel mode planning process performed by the mode planner 111a of the driving support 111 in parallel to the information generating process of FIG. 3 will now be described with reference to FIG. 4. Each time the travel route is transmitted from the navigation controller 121, the driving support 111 performs planning of the travel modes to be assigned to the respective sections in the travel route. Also, the mode planner 111a repeatedly performs planning of the travel mode at each planning cycle.

Figure 4:
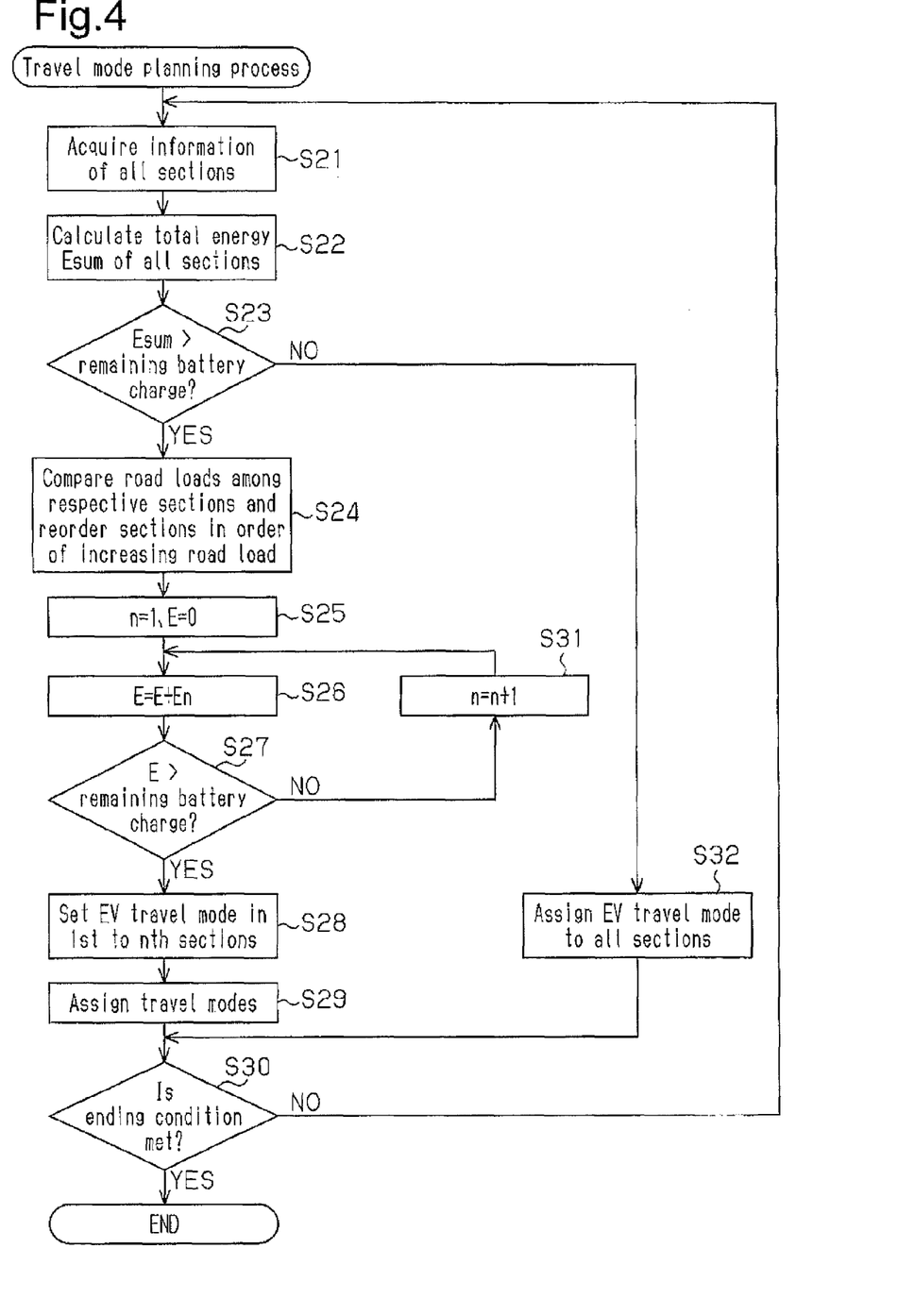
FIG. 4 is a flowchart of a procedure of a travel mode planning process performed by the travel support device shown in FIG. 1.

As shown in FIG. 4, when a destination point is set by the navigation controller 121, the driving support 111 acquires route information concerning all sections in the travel route (step S21). That is, based on the road load information generated for each section Sn by the information generator 121b, the mode planner 111a assigns a travel mode to each section as described below.

The driving support 111 calculates a total consumption energy Esum of all sections in the travel route (step S22). The driving support 111 determines whether the total consumption energy Esum of all sections in the travel route is greater than the remaining charge of the battery 113 (step S23). That is, the mode planner 111a determines whether all sections in the travel route can be travelled in the EV travel mode. If the driving support 111 determines that the total consumption energy Esum of all sections in the travel route is not greater than the remaining charge of the battery 113 (step S23: NO), the driving support 111 assigns the EV travel mode to all sections in the travel route (step S29) and proceeds to step S30.

If the driving support 111 determines that the total consumption energy Esum of all sections in the travel route is greater than the remaining charge of the battery 113 (step S23: YES), the road loads are compared among the sections in the travel route and the sections are reordered in the order of increasing road load (step S24). With the sections in the travel route that have been reordered in the order of increasing road load, the nth section is expressed as a section Sn. Also, the consumption energy in the section Sn will be expressed as En.

The driving support 111 sets the value n to 1 (n=1) and sets a consumption energy sum E to zero (E=0) (step S25). The driving support 111 adds the consumption energy En of the section Sn to the current consumption energy sum E to renew the consumption energy sum E (E=E+En) (step S26). The consumption energy sum E expresses the total of the consumption energies En of the 1st to nth sections of the sections in the travel route that have been reordered in the order of increasing road load.

The driving support 111 then determines whether the consumption energy sum E is greater than the remaining charge of the battery 113 (step S27). If the driving support 111 determines that the consumption energy sum E is not greater than the remaining charge of the battery 113 (step S27: NO), 1 is added to the current value n to renew the value n (n=n+1) (step S31). Thereafter a return to step S26 is performed and the processes of steps S26 and S27 are repeated. That is, the consumption energy En of the sections in the travel route is integrated one by one in the order starting from the section of low road load until the consumption energy sum E becomes greater than the remaining charge of the battery 113.

If the driving support 111 determines that the consumption energy sum E is greater than the remaining charge of the battery 113 (step S27: YES), the EV travel mode is assigned to the 1st to nth sections (step S28). The driving support 111 then assigns travel modes to all sections in the travel route (step S29).

Thereafter, the driving support 111 determines whether a travel mode planning process ending condition is met (step S30). That is, the mode planner 111a determines whether the remaining charge of the battery 113 has become slight. If the driving support 111 determines that there is a remaining charge of the battery 113 and the ending condition is not met (step S30: NO), it returns to step S21 and repeats the processes of steps S21 to S29, S31, and S32.

In contrast, if the navigation controller 121 determines that the remaining charge of the battery 113 is slight and the ending condition is met (step S30: YES), the travel mode planning process is ended because travel in the EV mode is no longer possible and there is no need to plan the assignment of the travel modes.

As described above, in the present embodiment, when information of a traffic congestion section is acquired by the VICS 125 or the probe information controller 126, the normal traveling road load of the section and the traffic congestion road load, which is a fixed road load, are compared and the road load information of the section is generated such that the lower of the road loads is set as the road load of the traffic congestion section. By the road load information of the traffic congestion section that is thus generated, the predicted consumption energy of the battery is made close to the actual consumption energy to enable optimization of consumption of the battery 113 in the travel route even when a traffic congestion section is included.

The present embodiment has the following advantages.

(1) When information of the section Sn, in which traffic congestion is occurring, is acquired, the road load Pn during normal traveling in the section Sn and the traffic congestion road load Pjam are compared and the road load information of the section is generated such that the lower of the road loads is set as the road load of the traffic congestion section. The traffic congestion road load Pjam is a fixed road load that is lower than a general road load when the vehicle 100 is undergoing normal traveling a horizontal road. That is, the traffic congestion road load Pjam or the normal traveling road load Pn that is lower than the traffic congestion road load Pjam is set as the road load of the traffic congestion section Sn. Inaccurate prediction of consumption energy of the battery 113 can thus be suppressed and optimization of the energy consumption of the battery 113 in the travel route is promoted even when a traffic congestion section is included.

(2) The road load learned based on the information of the vehicle 100 and on traveling environment information is set as the road load Pn during normal traveling in the traffic congestion section Sn. The precision of the normal traveling road load Pn is thus improved and the precision of setting the road load in each traffic congestion section based on the above-described comparison of the normal traveling road load Pn and the traffic congestion road load Pjam is also improved.

The above described embodiment may be modified as follows.

Figure 5:
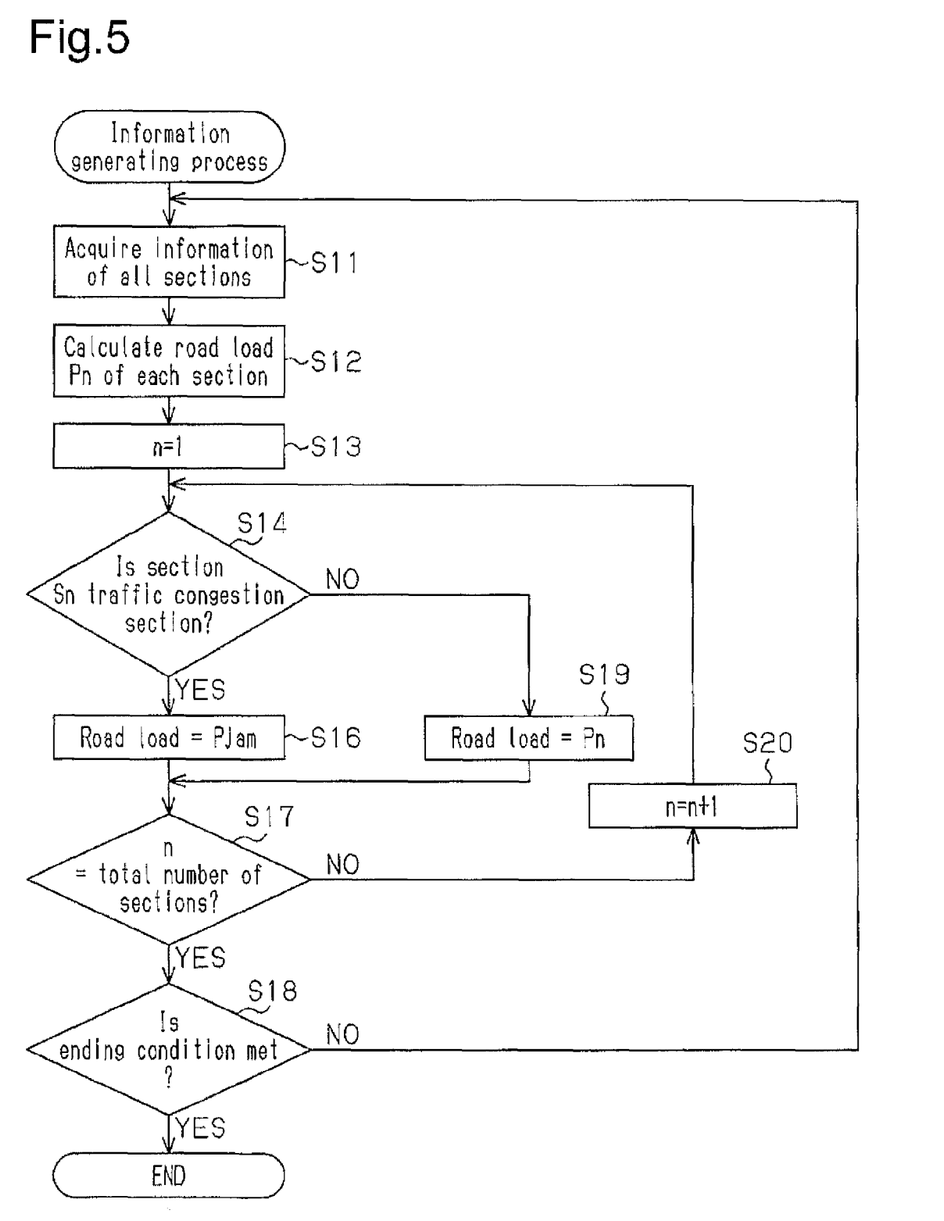
FIG. 5 is a flowchart of a modification of the procedure of the information generating process performed by the travel support device shown in FIG. 1.

In the above described the embodiment, the road load Pn in a normal state in the traffic congestion section Sn and the traffic congestion road load Pjam are compared and the lower of the road loads is set as the road load of the traffic congestion section. However, the traffic congestion road load Pjam may be set in all traffic congestion sections instead. That is, as a modification of the embodiment, the step S15 of FIG. 3 may be omitted as shown in FIG. 5. The driving support 111 determines whether each section Sn is a traffic congestion section (step S14) and if the section Sn is determined to be a traffic congestion section, the road load information of the section is generated such that the traffic congestion road load Pjam is set as the road load of the section Sn (step S16). In contrast, if the driving support 111 determines that the section Sn is not a traffic congestion section, the road load information of the section is generated such that the normal traveling road load Pn is set as the road load of the section Sn (step S19). That is, the predicted consumption energy of the battery 113 can be made close to the actual consumption energy without having to compare the normal traveling road load Pn and the traffic congestion road load Pjam because the traffic congestion road load Pjam is assigned to all sections in which traffic congestion is occurring. Optimization of the consumption of the battery 113 in the travel route is thus promoted even if a traffic congestion section is included.

In the above illustrated embodiment, the case where a CAN is used as the on-vehicle network NW is described as an example. However, the present invention is not restricted thereto and as long as an ECU and other components are connected in a communicative manner, another type of network such as Ethernet (registered trademark), FlexRay (registered trademark), or IEEE 1394, that is, FireWire (registered trademark) may be used for the on-vehicle network NW. Alternatively, these networks including a CAN may be used in combination. The flexibility of configuration is thereby improved for the vehicle in which the travel support device is used.

In the above illustrated embodiment, the GPS 101 is connected via the on-vehicle network NW to the navigation controller 121. However, the GPS 101 may be connected directly to the navigation controller 121.

In the above illustrated embodiment, the case where the navigation system 120 and the driving support 111 are configured separately is described as an example. However, the present invention is not restricted thereto and the navigation system and the driving support may be provided in the same device. The flexibility of configuration of the travel support device is thereby improved.

In the above illustrated embodiment, the case where the hybrid controller 110 and the driving support 111 are provided in the same device is described as an example. However, the present invention is not restricted thereto and the hybrid controller and the driving support may be provided in separate devices. The flexibility of configuration of the travel support device is thereby improved.

In the above illustrated embodiment, the case where the respective devices such as the navigation system 120 and the display 123 are provided in the vehicle 100 is described as an example. However, the present invention is not restricted thereto and a portable information processing device such as a portable phone and smartphone may have all or a portion of the functions of the respective devices such as the navigation system and the display. The flexibility of design of the travel support device is thereby improved.

In the above illustrated embodiment, the case where the driving support 111, the navigation system 120, and the map information database 122 are installed in the vehicle 100 is described as an example. However, the present invention is not restricted thereto and a portion of the functions of the driving support, the navigation system, and the map information database may be provided in an information processing device outside the vehicle or provided in a portable information processing device. An information processing device outside the vehicle may be an information processing center, and a portable information processing device may be a portable phone or a smartphone. With an information processing device outside the vehicle, information may be transmitted and received via a wireless communication line. In the case of a portable information processing device, the device may be connected to the on-vehicle network or may be connected by short-range communication, or information may be transmitted and received via a wireless communication line. The flexibility of design of the travel support device is thereby improved.

In the above described embodiment, the case where the assignment of the travel modes to the respective sections in the travel route is performed by the driving support 111 is described as an example. However, the present invention is not restricted thereto and such assignment of the travel modes may instead be performed by the navigation controller. The flexibility of design of the travel support device is thereby improved.

In the above described embodiment, the case where the assignment of the travel modes to the respective sections in the travel route is mainly executed in a process of setting a destination point in a state where the vehicle 100 is stopped at a certain point is described as an example. However, the present invention is not restricted thereto and such assignment of the travel modes may instead be executed at any point at which the vehicle is travelling toward the destination point. Also in executing assignment at any point, the assignment of the appropriate travel modes for all sections in the travel route may be performed. The flexibility of design of the travel support device is thereby improved.

In the above described embodiment, arrangements are made so that when there are traffic congestion sections in the travel route, the traffic congestion road load Pjam or the normal traveling road load Pn that is lower than the traffic congestion road load Pjam is set as the road load of each traffic congestion section. However, the vehicle speed in each section that the information generator 121b uses in calculating the road load may be set in each section in place of the road load. That is, a traffic congestion vehicle speed Vjam (for example, 10 km/h) or an normal traveling vehicle speed Vn that is lower than the traffic congestion vehicle speed Vjam may be set in each traffic congestion section. The road load of each section can be calculated from the vehicle speed and therefore practically the same advantages as those obtained in the case of setting the traffic congestion road load or the normal traveling road load that is lower than the traffic congestion road load as the road load in each section can be obtained. Also, the traffic congestion vehicle speed Vjam may be adapted to be always set in each traffic congestion section.

In the above described embodiment, the case where the learner 121a learns and stores information such as the road load in each section in the travel route in the map information database 122 is described as an example. However, the learning may be omitted if the minimum necessary precision can be obtained for setting the travel mode of the vehicle 100 in the respective sections being travelled.

Therefore, the present examples and embodiments are to be considered as illustrative and not restrictive and the invention is not to be limited to the details given herein, but may be modified within the scope and equivalence of the appended claims.

The invention claimed is:

1. A travel support device for supporting a vehicle having both an internal combustion engine and a motor as drive sources to move from a current GPS location to a destination GPS location, the travel support device comprising:
a processor that is programmed to:
receive the current GPS location from a GPS receiver;
acquire a travel route from the current GPS location to the destination GPS location;
divide the travel route into a plurality of sections;
for each of the plurality of sections:
calculate a normal traveling road load, which is a road load for the respective section during normal traveling of the respective section, the normal traveling road load being a road load in which traffic congestion is not taken into consideration;
acquire traffic congestion information for the respective section; and
based on the acquired traffic congestion information, determine whether traffic congestion is occurring in the respective section; and
for each of the plurality of sections in which traffic congestion is determined to be occurring:
compare the calculated normal traveling road load of the respective section, which is based on traffic congestion not occurring, with a fixed general traffic congestion road load that is lower than a general road load during general normal traveling without congestion;
if the calculated normal traveling road load of the respective section is lower than or equal to the fixed general traffic congestion road load, set a road load for the respective section to the calculated normal traveling road load;
if the normal traveling road load of the respective section is not lower than or equal to the fixed general traffic congestion road load, set the road load for the respective section to the fixed general traffic congestion road load; and
assign, based on the road load set for the respective section, a travel mode from among a first mode, in which a remaining energy charge of a battery of the vehicle is not maintained, and a second mode, in which the remaining energy charge of the battery is maintained.

2. The travel support device according to claim 1, wherein the processor is further programmed to: for each of the plurality of sections:
calculate the normal traveling road load of the respective section based on information about the vehicle and/or traveling environment information; and
store, in a memory, information related to the calculated normal traveling road load.

3. The travel support device according to claim 1, wherein the processor is further programmed to: for each section in which traffic congestion is not occurring:
set the road load for the respective section based on the calculated normal traveling road load; and
assign, based on the calculated normal traveling road load, the travel mode among the first mode and the second mode.

4. A travel support method for supporting a vehicle having both an internal combustion engine and a motor as drive sources to move from a current GPS location to a destination GPS location, the method comprising:
receiving, by a processor, the current GPS location from a GPS receiver;
acquiring, by the processor, a travel route from the current GPS location to the destination GPS location;

dividing, by the processor, the travel route into a plurality of sections;
for each of the plurality of sections:
  calculating, by the processor, a normal traveling road load, which is a road load for the respective section during normal traveling of the respective section, the normal traveling road load being a road load in which traffic congestion is not taken into consideration;
  acquiring, by the processor, traffic congestion information for the respective section; and
  based on the acquired traffic congestion information, determining, by the processor, whether traffic congestion is occurring in the respective section; and
for each of the plurality of sections in which traffic congestion is determined to be occurring:
  comparing, by the processor, the calculated normal traveling road load of the respective section, which is based on traffic congestion not occurring, with a fixed general traffic congestion road load that is lower than a general road load during general normal traveling without congestion;
  if the calculated normal traveling road load of the respective section is lower than or equal to the fixed general traffic congestion road load, setting, by the processor, a road load for the respective section to the calculated normal traveling road load;
  if the normal traveling road load of the respective section is not lower than or equal to the fixed general traffic congestion road load, setting, by the processor, the road load for the respective section to the fixed general traffic congestion road load; and
assigning, by the processor based on the road load set for the respective section, a travel mode from among a first mode, in which a remaining energy charge of a battery of the vehicle is not maintained, and a second mode, in which the remaining energy charge of the battery is maintained.

\* \* \* \* \*